United States Patent [19]
Snyder

[11] Patent Number: 6,079,674
[45] Date of Patent: Jun. 27, 2000

[54] SUSPENSION CLAMP HAVING FLEXIBLE RETAINING ARM

[76] Inventor: Darryl L. Snyder, 4520 N. Market St., Canton, Ohio 44714

[21] Appl. No.: 09/056,804

[22] Filed: Apr. 8, 1998

[51] Int. Cl.[7] ....................................................... F16L 3/12
[52] U.S. Cl. ............................................. 248/74.3; 248/62
[58] Field of Search ............................. 248/74.3, 62, 58, 248/68.1, 74.1, 74.5, 909

[56] References Cited

U.S. PATENT DOCUMENTS

| | | | |
|---|---|---|---|
| 2,338,031 | 12/1943 | Ellinwood | 248/74.3 X |
| 2,338,658 | 1/1944 | Morehouse | 248/74.3 |
| 3,429,985 | 2/1969 | Czigler | 248/74.3 X |
| 3,632,071 | 1/1972 | Cameron et al. | 248/74.3 |
| 4,447,934 | 5/1984 | Anscher | 248/74.3 X |
| 4,609,171 | 9/1986 | Matsui | 248/74.3 |
| 4,779,828 | 10/1988 | Munch | 248/74.3 |
| 5,344,112 | 9/1994 | Peterson et al. | 248/74.3 X |

FOREIGN PATENT DOCUMENTS

| | | | |
|---|---|---|---|
| 2442414 | 3/1976 | Germany | 248/74.3 |
| 933929 | 8/1963 | United Kingdom | 248/74.3 |

*Primary Examiner*—Ramon O. Ramirez
*Attorney, Agent, or Firm*—Sand & Sebolt

[57] ABSTRACT

The present invention relates to a suspension clamp having a locking characteristic for retaining a bundled line-set assembly of an air-conditioning system. The clamp is capable of retaining the line-set assembly in both locked and unlocked arrangement during both temporary and permanent installation of the system. The free end of the clamp retaining arm is lengthy and flexible to interconnect with a mounted end on the base portion to form a transverse loop to surround the line-set assembly.

8 Claims, 2 Drawing Sheets

SUSPENSION CLAMP HAVING FLEXIBLE RETAINING ARM

TECHNICAL FIELD

The present invention relates generally to a supporting or suspension clamp for retaining a so-called line-set assembly for an air-conditioning system, the clamp having a flexible restraining arm and a locking mechanism situated on an integral base. The flexible arm portion of the clamp forms a loop when the free end of the arm is inserted into the opposite mounted end of the locking mechanism. The locking mechanism of the clamp is fully releasable for positive engagement with the line-set assembly for both clamped and unclamped load-supporting arrangement. The line-set assembly is normally comprised of a larger metallic gas line such as one containing a refrigerant gas, the larger line being surrounded by foamed rubber insulation and a smaller metallic liquid line which is uninsulated for containing the condensed liquid refrigerant. The parallel bundled lines and insulation together for refrigerant gas and liquid constitute the line-set assembly.

BACKGROUND OF THE INVENTION

The installation of interior piping systems normally occurs subsequent to the construction of the frame of a building structure, and during the installation process, the piping system is secured directly to the studs, beams or supports of the building framework. As is frequently the case, the piping systems do not inherently follow the framework of the building, and may be installed at a much later time such as during use of the building or upon improvements thereto. Spans or lengths of the elongated pipe itself are often unsupported, the pipe weight causing the pipe per se to flex or bend along unsupported lengths. Also fluid flow in the pipe must be braced against additional loading which causes additional flexing. Unsupported lengths of pipe must be braced to prevent the failure or degradation of pipe joints and fixtures, as well as operative connected components which operation may cause vibration.

The use of U-shaped members to brace unsupported lengths of pipe where the pipe is located in the arcuate portion of such supporting members, and the ends of the U-shaped members are secured to a rigid support member or surface, is common practice in the trade. Use of the U-shaped members such as U-clamps requires that the pipe extend into proximity to the rigid support member and the clamps must be attached to the support member using separate fasteners. Extensive use of such clamps result in increased time and effort during installation and attendant installation costs when nails or screws are employed to mount the clamps. Most clamps have relatively short lengths and must be used in multiples to adequately support elongated unsupported runs of pipe at spaced locations. Their great lengths require their location at a greater number of spaced areas where the rigid support members are located. The pipe is secured to the supporting members by separate mechanical fasteners as aforesaid.

SUMMARY OF THE INVENTION

It is an object of the present invention to provide a self-locking suspension clamp which provides positive support for bundled pipes and preassembled plural units such as a so-called line-set assembly including condensate lines used to interconnect component parts of an air-conditioning system. The clamp may also be used in connection with, but not limited to condensate lines, electrical conduits, gang wiring, drain waste and vent lines for plumbing, and fire sprinkler systems as well as water supply lines. In addition, the clamp may be used to retain low-voltage thermostat control wiring as desired. The clamp is capable of supporting the line-set assembly in both locked and unlocked condition.

Another object of this invention is to provide a suspension clamp having a greater lineal length than most commonly-used U-shaped clamps and one which can be fitted to cover a limited portion of rigid supporting structures such as plural ceiling and floor joists, the clamp having means to facilitate permanent attachment to spaced-apart support members by various fastening members. The clamp has greater lineal width than ordinary U-clamps or wires such as 1 inch to 1¼ inch width so that it does not cut through the rubber insulation when in use.

Another object of this invention is to provide a suspension clamp having a locking characteristic for retaining bundled condensate lines of an air-conditioning system which clamp can hold the lines in both locked and unlocked arrangement during both temporary and permanent installation of the overall system. An individual clamp can hold as much as 50 pounds of weight in its locked inverted position in ceiling joists.

The clamp includes a base having top and bottom portions, a retaining arm having a flexible free end portion and an opposite mounted end portion, both of which are incorporated into the base wherein the retaining arm has sufficient length and flexibility to bend so that the arm free end can interconnect with the mounted end to form a continuous loop for locked engagement of the retaining arm and the mounted end. At least one pair of spaced-apart transverse openings in the base portion is used for locating suitable attachment members to a plurality of supporting structures. The clamp when locked will not vibrate apart or unlock due to vibration caused by operative units of an air-conditioning system. The weight of the rubber insulation such as Armoflex of a line-set assembly assists in keeping the clamp locked. The clamps can be manufactured having a transverse loop to enclose the line-set assembly varying from 2½ inch to 6 inch or more in circumference.

DESCRIPTION OF THE PREFERRED EMBODIMENT

Figure 1:
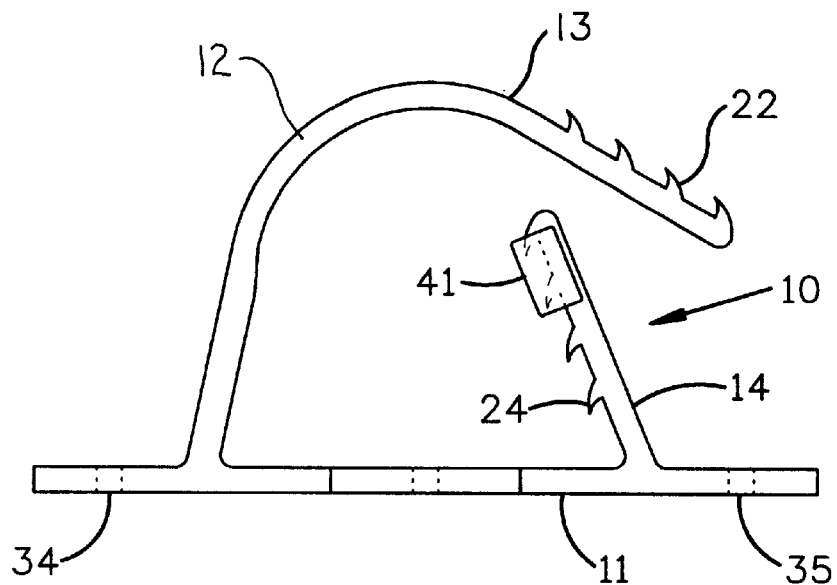
FIG. 1 is an enlarged side elevational view of the suspension clamp in an open position embodying the concept of the present invention.

A suspension clamp embodying the concept of the present invention is designated generally by the reference numeral 10 in the accompanying drawings. The clamp 10 is integrally molded in one piece such as by an injection molding process, for example, of durable plastic material such as polypropylene, high-density polyethylene, or other injectable moldable plastic material. The clamp 10 includes a base plate 11 having an integral retaining arm 12 connected to one end of base plate 11. Retaining arm 12 has sufficient length and flexibility to allow the free end 13 to reach a mounted end portion at a spaced distance from the retaining arm 12 to form a continuous transverse loop. Retaining arm 12 is essentially a striplike member that has a generally uniform cross-sectional shape wherein the free end 13 and mounted end portion 14 are complemental in width and cross-sectional shape for their positive interconnection. The inherent nature and pliability of the fabricated plastic material allows for greater flexibility of retaining arm 13 due to its length while providing the required locking strength when connected to the mounted end 14.

Figure 2:
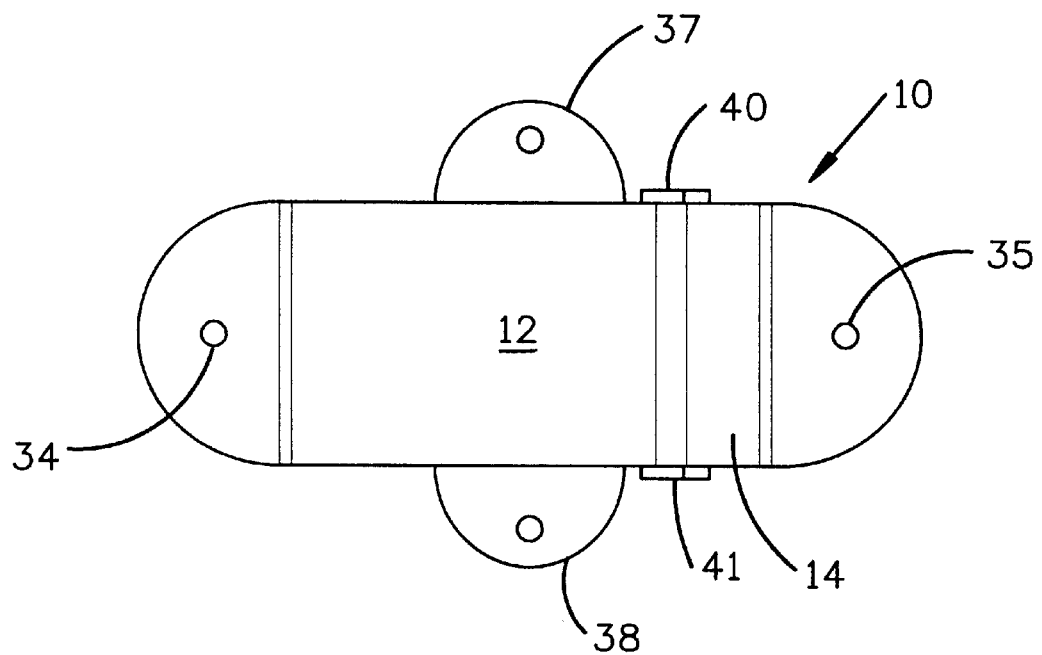
FIG. 2 is a top plan view of the suspension clamp shown in FIG. 1 in a locked position embodying the concept of the present invention.

As shown in FIGS. 1 and 2 the terminating free end 13 of retaining arm 12 has a plurality of serrated lip portions 22 which extend outwardly from the free end 13 and through the full width of the retaining arm 12. The lip portions 22 of the retaining arm 12 are angled backwardly from the terminus of the free end 13 to comprise at least two and preferably three locking lip portions. The mounted end 14 has a complementally-shaped plurality of serrated lip portions 24 which extend inwardly and downwardly toward the base plate 11. Thus, mounted end 14 is essentially fixed to the base and is generally rigid having at least two and preferably three lip portions for positive locking engagement with the opposing lip portions 22 of free end 13. FIG. 1 shows the bracket in the open position for receiving the line-set assembly 25 as shown in FIGS. 3 and 4.

Figure 3:
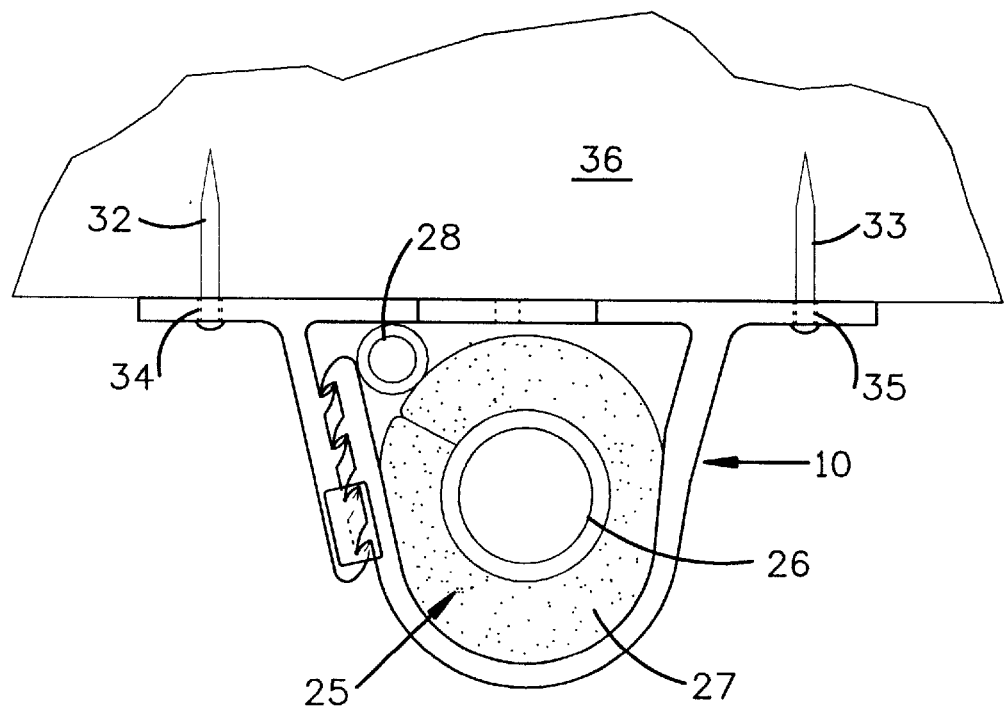
FIG. 3 is an enlarged side elevational view of the suspension clamp of FIGS. 1 and 2 in a locked position containing the lie-set assembly supported by a supporting surface.

The line-set assembly 25 as shown in FIG. 3 in cross-section is comprised of the larger refrigerant gas line 26 surrounded by the foamed rubber insulation material 27 with condensed uninsulated liquid refrigerant line 28 running parallel thereto. The line-set is commonly taped together at spaced intervals to form a unified bundle for ease of handling and installation. The line-set 25 is only loosely held in the bracket 10 as shown in FIG. 3 to allow for expansion and contraction of the line-set upon temperature changes, and to secure the line-set against vibration caused by compressor motor units.

The two arms 12 and 14 of the clamp 10 have a series of slightly enlarged thicker portions near the base plate 11. The clamp 10 is preferably mounted at equispaced locations along the length of the lengthy line-set assembly 25. The line-set can be placed in the clamp progressively after the clamp is attached to one supporting surface such as by nails or screws 32 and 33. A pair of openings 34 and 35 are provided in base portion 11 in spaced-apart location. The attachment members 32 and 33 can be precisely located by forcefully driving the attachment members through the openings 34 and 35 in the base plate into the supporting surface 36.

Figure 4:
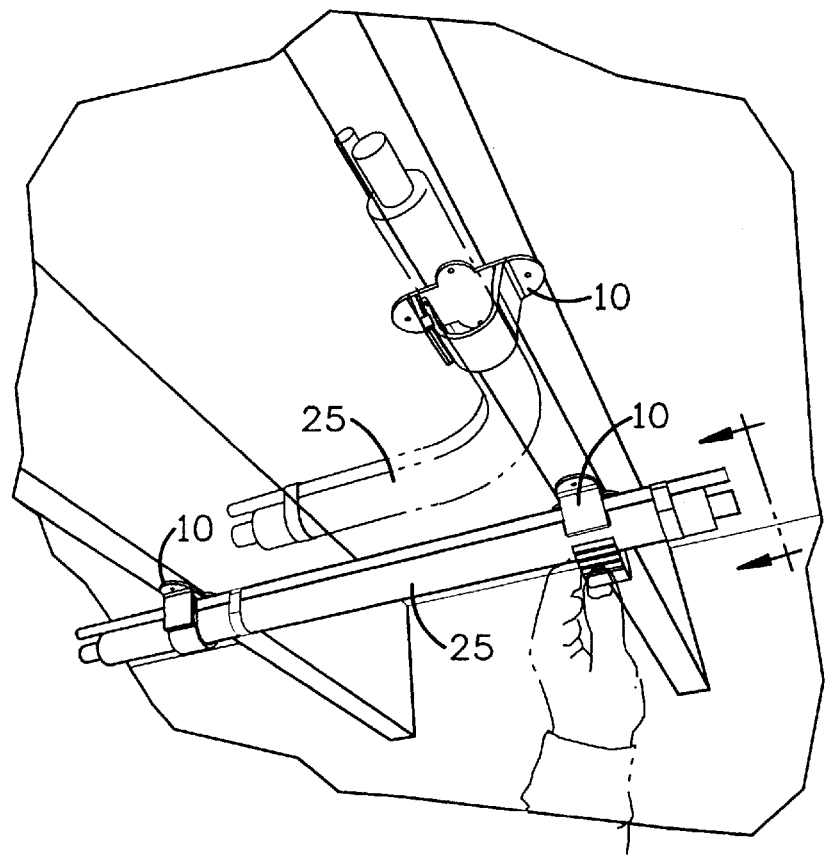
FIG. 4 is an enlarged perspective view of a plurality of suspension clamps in fully supported arrangement attached to a plurality of ceiling joists showing progressive attachment of the line-set assembly in both lineal and right-angled installation.

The base plate 11 of the clamp has a pair of outwardly-facing transverse projections 37 and 38 in its upper surface which serve to facilitate precise attachment of the clamp to rigid spaced-apart support surfaces such as ceiling joists as shown in FIG. 4. Each of the transverse projections 37 and 38 has a suitable opening therein to receive attachment members. The mounted end 14 has a pair of perpendicular small tabs 40 and 41 on its side surfaces to prevent lateral movement of the retaining arm end portion 13 when in locked position. The clamp is preferably formed by injection molding as stated having preferred overall lengths varying from 1 to 1½ to 2 inch lengths as desired for efficiency of installation in plural progressive support of the retained line-set. Small sizes of the clamp such as those from 1½ to 2 to 3 inch sizes can be used by residential line-set assemblies, while larger sizes of the clamp from 2½ to 6 inch sizes can be used for larger commercial air-conditioning systems. FIG. 4 shows how the line-set assembly is progressively inserted into the plural clamps in initially unlocked relation and subsequently in fully locked relation for permanent installation of the line-set. The transverse looped-over opening in the clamp extends only through the retaining arm and the mounted end for easy installing of the line-set 25 in the clamp. The line-set is installed in a progressive series of the clamps in temporary unlocked relation, and then the plural mounted clamps are locked to permanently lock in the line-set. In the event the line-set subsequently needs to be repaired or replaced, it can quickly be removed from the clamps by unlocking the retaining arm 13 from the mounted end 14, leaving the clamps in place as desired.

As stated, the molded clamp is formed by injection molding of the heated plastic material in a suitable mold capable of forming the clamp with generally uniform wall thickness including the retaining arm and mounted end. The corners of the shaped mold are smoothly contoured into gently flowing curves for desirable injection of the molten plastic in a periodic molding process. The injected-molded shape is formed to varied lengths for ready end use and the transverse loop is formed to handle various overall sizes of the line-sets. The lengths are made to cover individual rigid supporting surfaces such as the co-planar underlying surfaces of ceiling and floor joists. Obviously, the clamps in series can be used to support the line-set through long unsupported spans of the line-set.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention are by way of example, and the scope of the invention is not limited to the exact details shown or described.

Various modifications may be resorted to within the spirit and scope of the appended claims.

I claim:

1. A suspension clamp for retaining a line set assembly for an air conditioning system, the line set assembly having a foam-wrapped refrigerant gas line and a liquid refrigerant line; the clamp comprising:

a base plate having a first end and a second end spaced from the first end;

a flexible retaining arm connected to the base plate adjacent the first end of the base plate;

a mounted end portion connected to the base plate adjacent the second end of the base plate;

the retaining arm and the mounted end portion being non-hingedly connected to the base plate;

the retaining arm being moveable between a first position where the retaining arm is connected to the mounted end portion and a second position where the retaining arm is not connected to the mounted end portion;

the retaining arm and the mounted end portion converging toward each other immediately as they extend away from the base plate in both the first and second positions;

the retaining arm having a free end and a curved portion disposed between the free end and the connection of the retaining arm and the base plate;

the curved portion of the retaining arm being adapted to receive the foam-wrapped refrigerant gas line;

at least one lip extending outwardly from the retaining arm; and at least one lip extending inwardly from the mounted end portion; the retaining arm being selectively connected to the mounted end portion in the first position by engaging the lip of the retaining arm with the lip of the mounted end portion.

2. The clamp of claim 1, wherein the retaining arm is in the form of a strip having a width greater than its thickness.

3. The clamp of claim 2, wherein said at least one lip of the retaining arm extends across the entire width of the retaining arm.

4. The clamp of claim 1, wherein the base plate, the retaining arm, and the mounted end portion are fabricated from polypropylene.

5. The clamp of claim 1, wherein the base plate, the retaining arm, and the mounted end portion are fabricated from polyethylene.

6. The clamp of claim 1, wherein the base plate defines first and second mounting openings; the first mounting opening being disposed between the first end of the base plate and the retaining arm; and the second mounting opening being disposed between the second end of the base plate and the mounted end portion.

7. The clamp of claim 1, wherein four spaced lips project inwardly from the mounted end portion and four spaced lips project outwardly from the retaining arm; the lips on the mounted end portion being spaced apart the same as the lips on the retaining arm.

8. The clamp of claim 7, wherein:

the four lips on the retaining arm include a proximal lip, a distal lip and two intermediate lips disposed between the proximal and distal lip;

the proximal lip being disposed at the end of the retaining arm;

the proximal lip on the retaining arm being spaced from the distal lip on the retaining arm by a first distance;

the four lips on the mounted end portion include a proximal lip, a distal lip and two intermediate lips disposed between the proximal and distal lips;

the proximal lip of the mounted end portion being disposed at the end of the mounted end portion;

the distal lip on the mounted end portion being spaced from the base plate by a second distance; and the first distance being greater than the second distance.

* * * * *